US009285110B2

(12) United States Patent  
Branstetter

(10) Patent No.: US 9,285,110 B2  
(45) Date of Patent: Mar. 15, 2016

(54) THEFT RESISTANT COLLAR AND LAMP

(71) Applicant: Grote Industries, Inc., Madison, IN (US)

(72) Inventor: Cary D. Branstetter, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 411 days.

(21) Appl. No.: 13/693,125

(22) Filed: Dec. 4, 2012

(65) Prior Publication Data

US 2013/0148374 A1     Jun. 13, 2013

Related U.S. Application Data

(60) Provisional application No. 61/567,709, filed on Dec. 7, 2011.

(51) Int. Cl.
| | |
|---|---|
| *F21V 15/00* | (2015.01) |
| *F21V 33/00* | (2006.01) |
| *B60Q 1/26* | (2006.01) |
| *B60Q 1/32* | (2006.01) |
| *F21W 111/00* | (2006.01) |
| *F21Y 101/02* | (2006.01) |

(52) U.S. Cl.  
CPC ............... *F21V 33/00* (2013.01); *B60Q 1/263* (2013.01); *B60Q 1/32* (2013.01); *F21V 15/005* (2013.01); *F21W 2111/00* (2013.01); *F21Y 2101/02* (2013.01)

(58) Field of Classification Search  
CPC ..... F21V 15/005; F21V 15/013; B60Q 1/263; B60Q 1/2638; B60Q 1/2634  
USPC .......................................... 362/545, 549, 376  
See application file for complete search history.

(56) References Cited

U.S. PATENT DOCUMENTS

| | | | |
|---|---|---|---|
| 6,244,736 B1 | 6/2001 | O'Neal | |
| 6,502,975 B1 | 1/2003 | Branstetter | |
| 7,631,993 B2 * | 12/2009 | Russello et al. | ............... 362/374 |
| 2003/0035300 A1 * | 2/2003 | Branstetter | .................. 362/549 |
| 2005/0253032 A1 * | 11/2005 | Pitlor | ......................... 248/206.5 |

* cited by examiner

*Primary Examiner* — Karabi Guharay  
(74) *Attorney, Agent, or Firm* — Woodard, Emhardt, Moriarty, McNett & Henry LLP

(57) ABSTRACT

A lamp assembly for attachment to a vehicle, comprising a lamp which includes a housing having an axially extending member, the axially extending member extendable through an opening in a vehicle mounting panel and below the vehicle mounting panel. An anti-theft collar is included around at least a portion of the axially extending member, the collar being securable to said axially extending member. The collar has a first set of projections to snap fit attach to the vehicle mounting panel at a first depth and a second set of projections to snap fit attach to the vehicle mounting panel at a second depth.

19 Claims, 10 Drawing Sheets

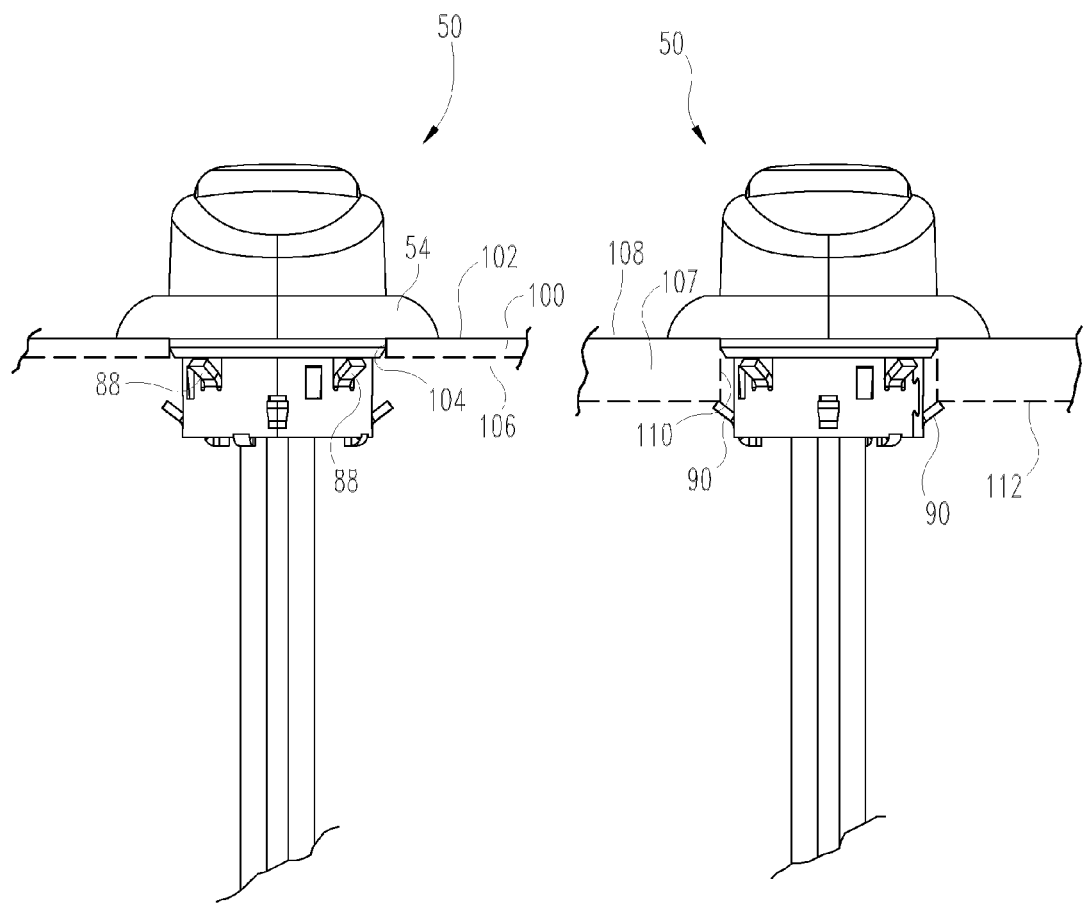
*Fig. 20*　　　*Fig. 21*

THEFT RESISTANT COLLAR AND LAMP

CROSS-REFERENCE TO RELATED APPLICATIONS

This application claims the benefit of U.S. Provisional Application No. 61/567,709 filed on Dec. 7, 2011, which is hereby incorporated by reference.

FIELD OF THE INVENTION

The present invention is related to electric lamps for vehicles, and more specifically to theft resistant attachment of an electric lamp to a vehicle.

BACKGROUND

Vehicles, for example, trucks, may utilize replaceable lamps, for example, side marker lamps, that are installed on the sides of trucks and/or trailers in order to clearly mark the boundaries of the trucks and/or trailers at night. Historically, these lamps had to be replaced on a regular basis when lamp elements failed. Prior art lamp assemblies utilized a system that permitted removal of the lamp assemblies for replacement. For example, by rotating the lamp assembly in a bracket permanently affixed to the vehicle where rotation of the lamp assembly allows the lamp assembly to be completely removed from the bracket.

However, there are times when a lamp that is not easily removable, such as by a thief, is desirable. Therefore there is a need for a vehicular lamp mounting that is theft resistant. The present application is directed towards meeting that need.

SUMMARY

According to one aspect, a lamp assembly for attachment to a vehicle is disclosed, comprising: a lamp which includes a housing having an axially extending member, said axially extending member extendable through an opening in a vehicle mounting panel and below the vehicle mounting panel; a collar around at least a portion of said axially extending member; said collar being securable to said axially extending member; said collar having a first set of projections to snap fit attach to the vehicle mounting panel at a first depth; and, said collar having a second set of projections to snap fit attach to the vehicle mounting panel at a second depth. The first set of projections may comprise first tabs which project radially outward of said collar, said first tabs being deflectable radially inwardly as said collar is inserted into the opening in the vehicle mounting panel, said first tabs being located co-planar with each other. The second set of projections may comprise second tabs which project radially outward of said collar, said second tabs being deflectable radially inwardly as said collar is inserted into the opening in the vehicle, said second tabs being located co-planar with each other and at a depth axially below said first tabs. The collar may comprise a third plurality of tabs, wherein said third plurality of tabs project radially inwardly and bite into said axially extending member to secure said axially extending member to said collar. The collar may comprise a fourth plurality of tabs positioned on a bottom surface of said collar and oriented inwardly.

According to another aspect, a theft resistant collar adapted for use in connection with a lamp assembly for attachment to a vehicle is disclosed, the lamp assembly having a lamp which includes a housing having an axially extending member extendable through an opening in a vehicle mounting panel and below the vehicle mounting panel, comprising: a cylindrical collar body sized to fit around at least a portion of axially extending member below the vehicle mounting panel; said collar being securable to said axially extending member; said collar having a first set of projections to snap fit attach at a first depth; and, said collar having a second set of projections to snap fit attach at a second depth. The first set of projections may comprise first tabs which project radially outward of said collar, said first tabs being deflectable radially inwardly as said collar is inserted into the opening in the vehicle mounting panel, said first tabs being located co-planar with each other. The second set of projections may comprise second tabs which project radially outward of said collar, said second tabs being deflectable radially inwardly as said collar is inserted into the opening in the vehicle, said second tabs being located co-planar with each other and at a depth axially below said first tabs. The collar may comprise a third plurality of tabs, wherein said third plurality of tabs project radially inwardly and bite into said axially extending member to secure said axially extending member to said collar. The collar may comprise a fourth plurality of tabs positioned on a bottom surface of said collar and oriented inwardly.

Still additional features and embodiments of the invention as well as advantages associated therewith will be apparent to those of ordinary skill in the art from the descriptions herein, including the appended claims.

BRIEF DESCRIPTION OF THE DRAWINGS

FIG. 20 is a side elevation view of the FIG. 1 lamp assembly mounted on a first portion of a vehicle.

FIG. 21 is a side elevation view of the FIG. 1 lamp assembly mounted on a first portion of a vehicle.

DETAILED DESCRIPTION

Figure 3:
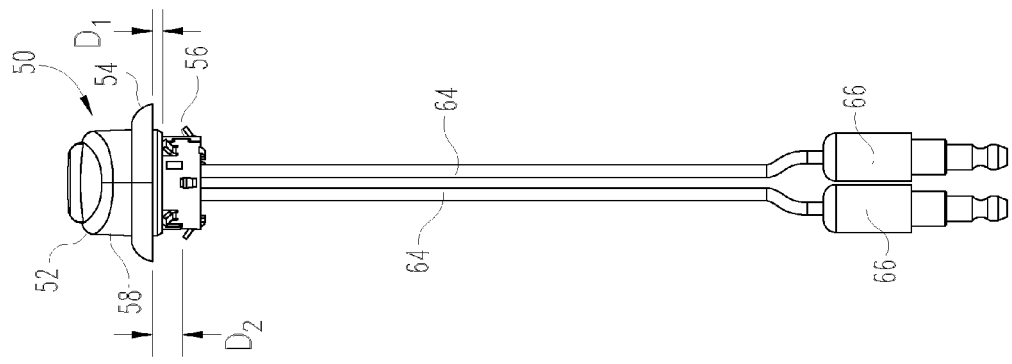
FIG. 3 is a left side elevational view of the FIG. 1 lamp assembly.
Figure 2:
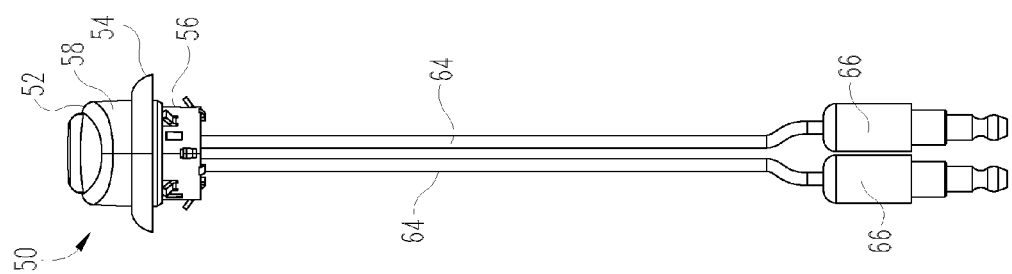
FIG. 2 is a right side elevational view of the FIG. 1 lamp assembly.
Figure 1:
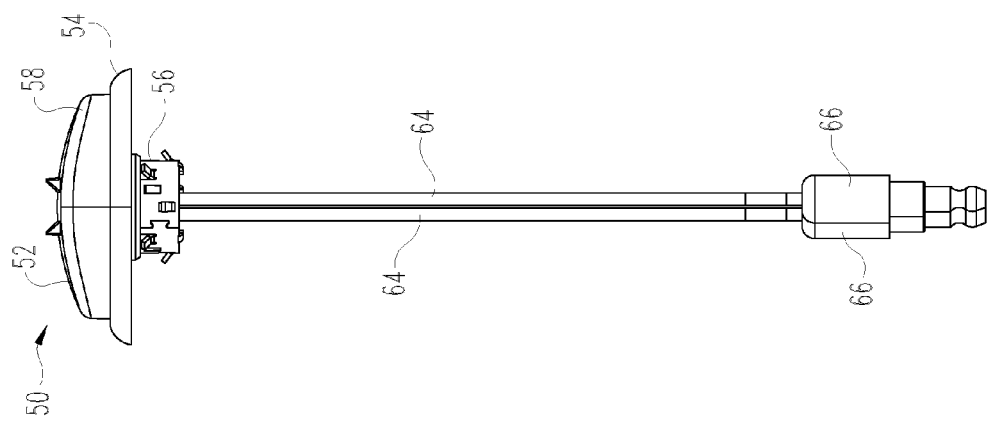
FIG. 1 is a front elevational view of the lamp assembly.
Figure 4:
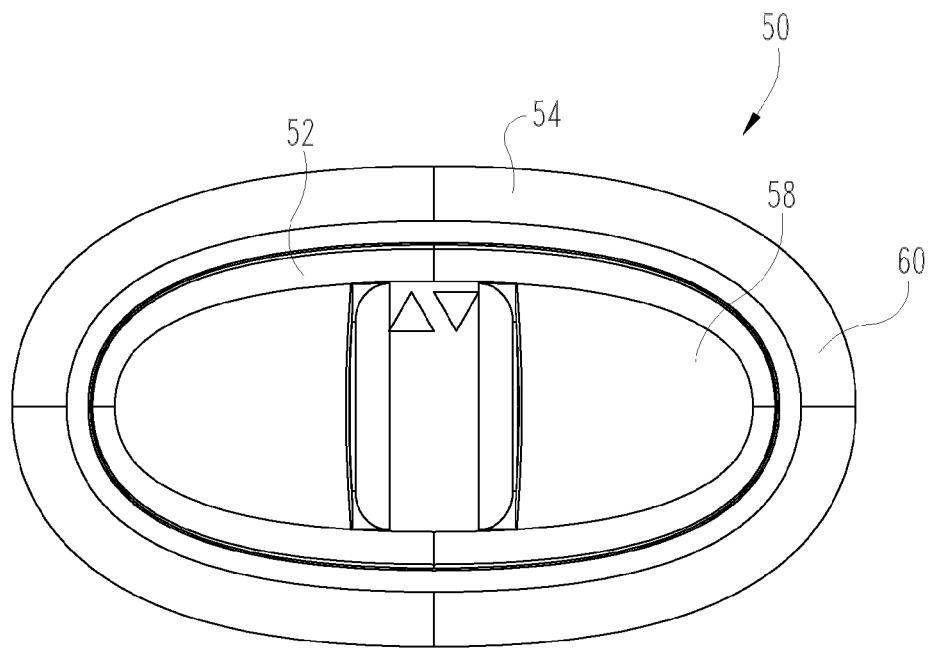
FIG. 4 is a top plan view of the FIG. 1 lamp assembly.
Figure 5:
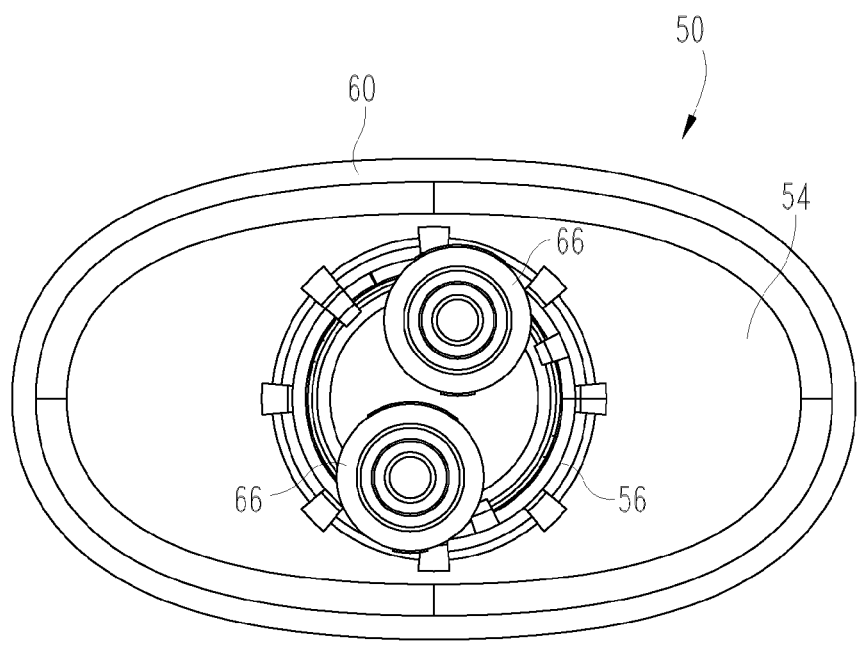
FIG. 5 is a bottom plan view of the FIG. 1 lamp assembly.

Reference will now be made to certain embodiments and specific language will be used to describe the same. It will nevertheless be understood that no limitation of the scope of this disclosure and the claims are thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

Vehicular lamp assemblies may now utilize LEDs or other lighting as the illumination element. The present application therefore provides a lamp assembly that prevents, or at least impedes, the lamp assembly from being removed from the vehicle after the lamp assembly has been installed thereon. The purpose of the disclosed lamp assembly is to make it hard to steal the disclosed lamp assembly off the vehicle, and if done so then with substantially damaging the lamp assembly in the process of removal.

FIGS. 1-5 illustrate lamp assembly 50. Lamp assembly 50 includes lamp 52, grommet skirt 54 and collar 56.

Figure 6:
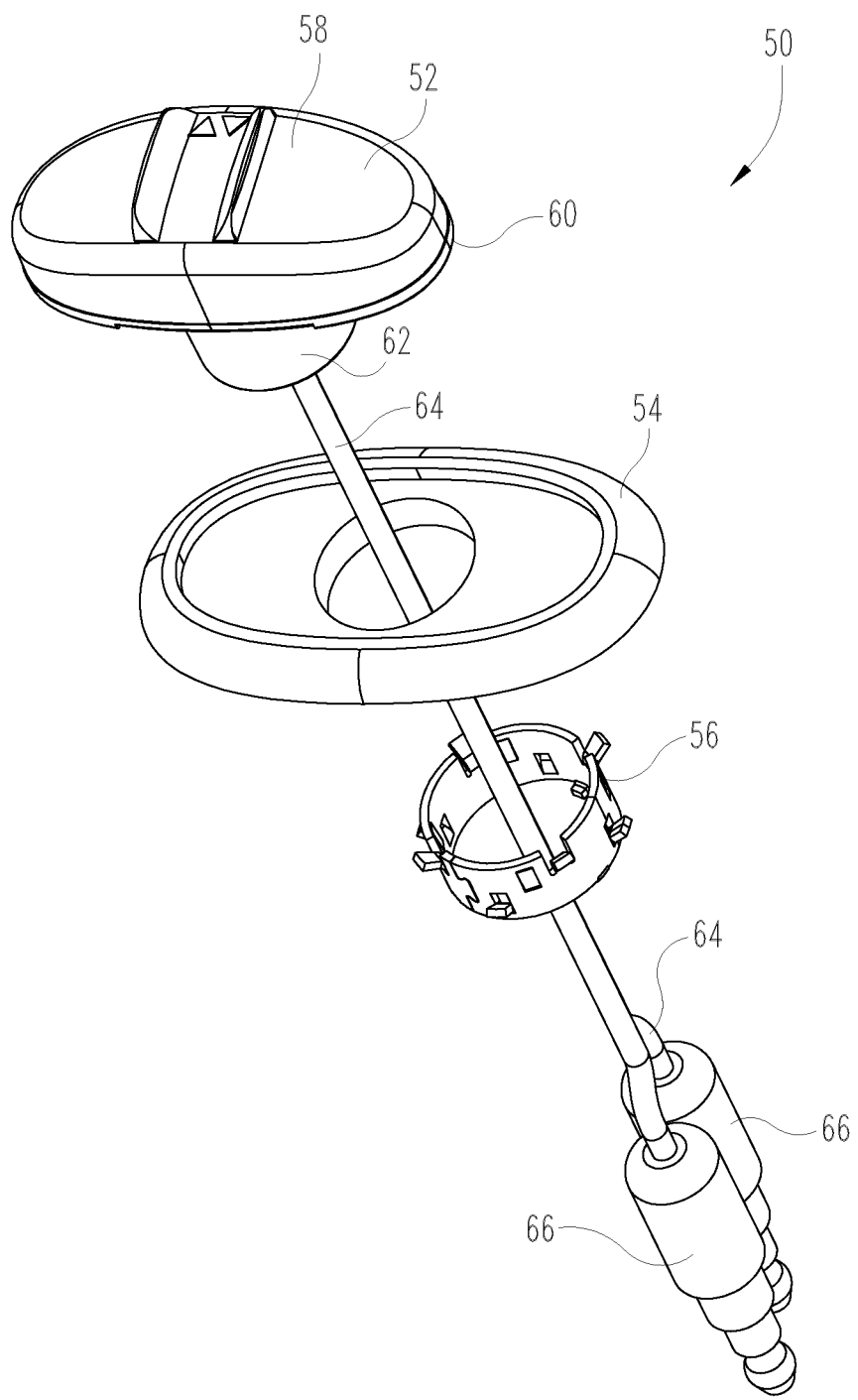
FIG. 6 is a perspective assembly view of the FIG. 1 lamp assembly including a lamp, grommet skirt, and a collar.
Figure 7:
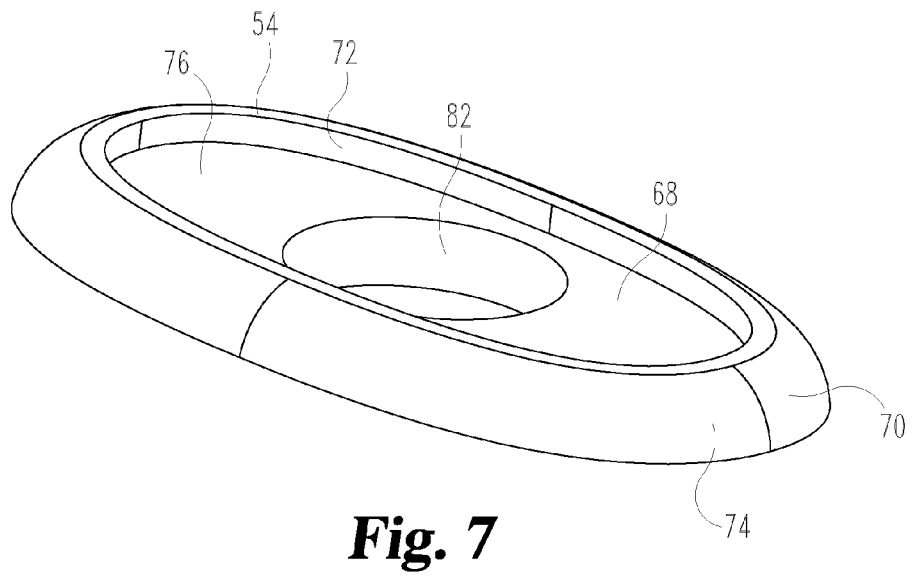
FIG. 7 is a perspective view of the FIG. 6 grommet skirt.
Figure 8:
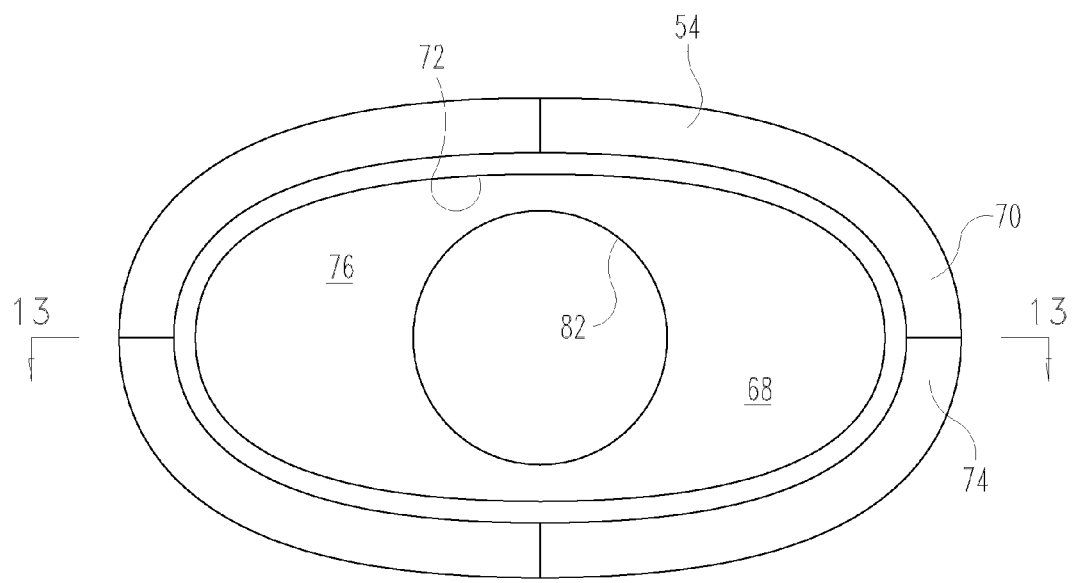
FIG. 8 is a top plan view of the FIG. 7 grommet skirt.
Figure 9:
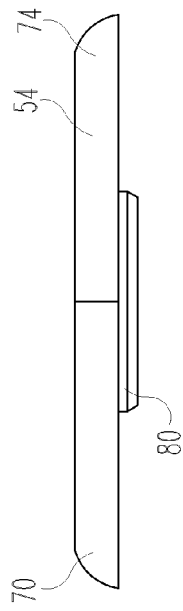
FIG. 9 is a front elevational view of the FIG. 7 grommet skirt.

Referring to FIG. 6, lamp assembly 50 is shown in an exploded assembly view showing lamp 52, grommet skirt 54 and collar 56. As shown in FIG. 6, lamp 52 includes housing 58, including a transparent or translucent lens, and defining a rim 60 and axially extending member 62 (cylindrical, oblong, square or otherwise) extending from the bottom of housing 58 with wires 64 extending below member 62, with terminals 66 attached to the free ends of wires 64. Rim 60 is preferably configured to have a larger width or diameter than the width or diameter of the axially extending member 62, which allows the axially extending member 62 to be inserted through a hole in a vehicle mounting panel, while the rim 60 is held against the outside surface of the vehicle mounting panel. Terminals 66 are used to electrically couple lamp 52 to the vehicle or trailer electrical system using conventional plug terminals. Housing 58 may be formed from any suitable material including, but not limited to, plastic, glass, and the like.

Figure 13:
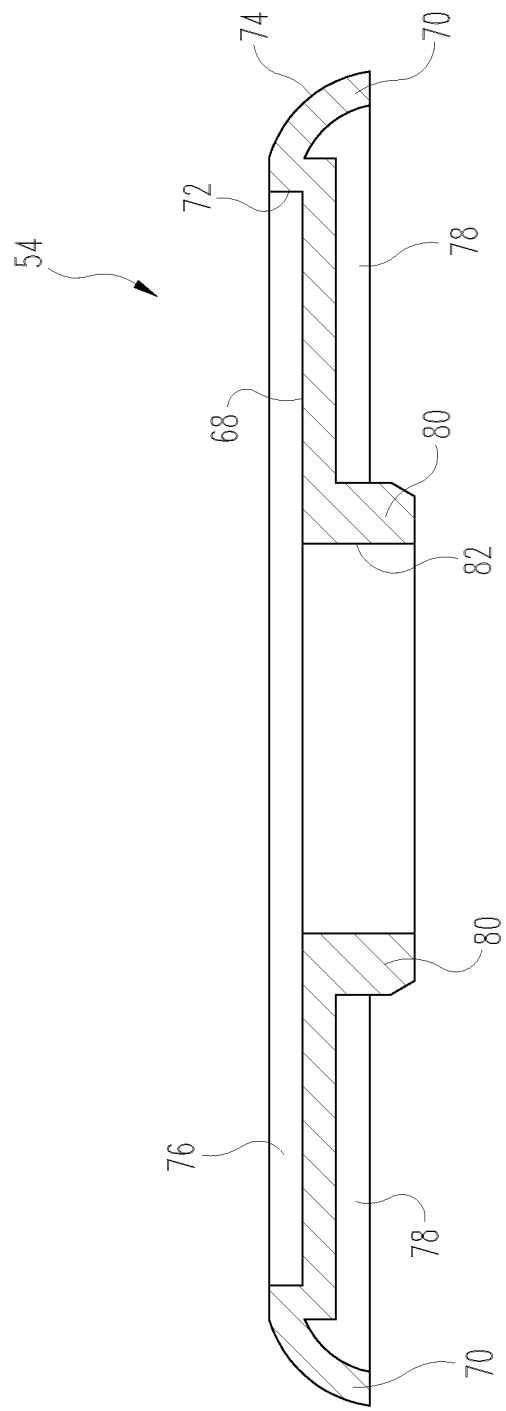
FIG. 13 is a side cross sectional view of the FIG. 7 grommet skirt taken along line 13-13 in FIG. 8.

Referring now to FIGS. 7-13, grommet skirt 54 is shown. Grommet skirt 54 includes flange 68 with rim 70 around the periphery of flange 68. Rim 70 includes wall 72 and outer surface 74. Wall 72 and flange 68 define recess 76. As shown in FIGS. 9-13, grommet skirt 54 also includes projection 80 extending from the bottom of flange 68 with inner opening 82 extending through flange 68 and projection 80 so that projection 80 surrounds the periphery of inner opening 82. As shown in FIG. 13, rim 70, flange 68 and projection 80 define recess 78. The lamp 52 and skirt 54 are merely an example of what may be used in connection with the present invention. Other shapes and arrangements, particularly those known in vehicle lighting, such as running lights, brake lights, and otherwise may be employed. Grommet skirt 54 is preferably formed from a flexible material, such as rubber, although other materials may be used as well, including, including, but not limited to, plastic, ceramic, metal, and the like.

Figure 14:
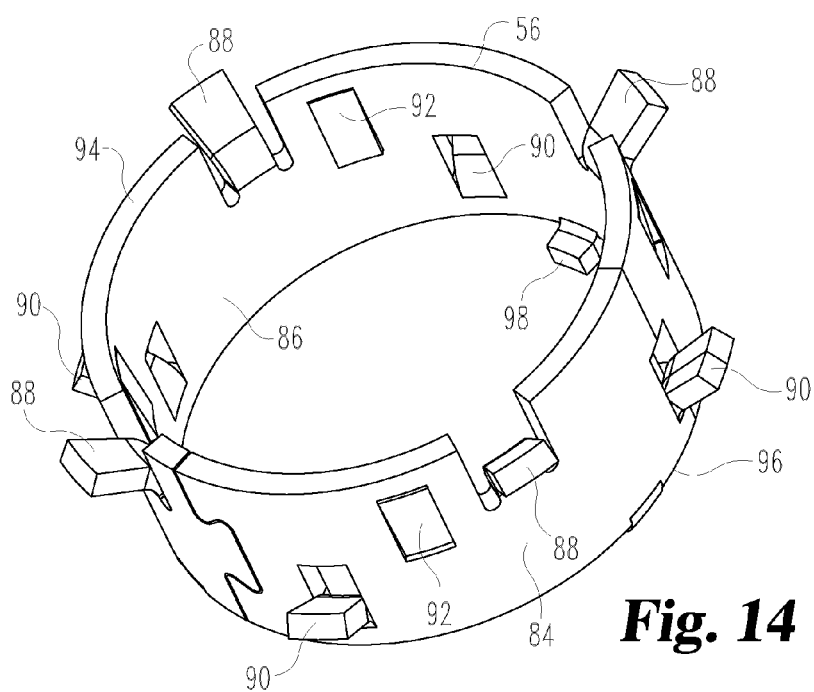
FIG. 14 is a perspective view of the FIG. 6 collar.
Figure 15:
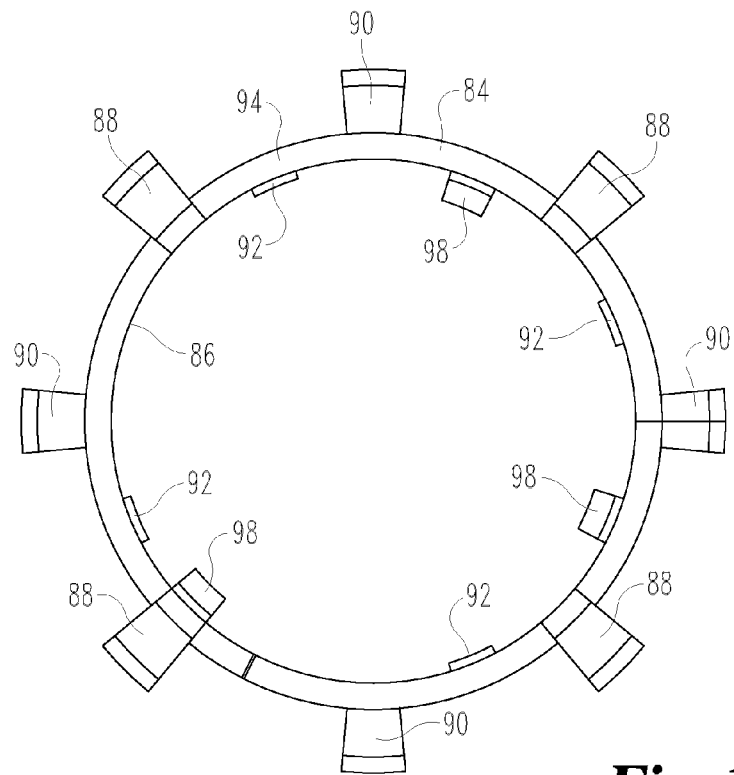
FIG. 15 is a top plan view of the FIG. 14 collar.

Referring now to FIGS. 14-19, collar 56 is illustrated. Collar 56 includes body 84, defining inner opening 86. Collar 56 and/or body 84 may be cylindrical, or at least tubular, although it may be other shapes as well. Collar 56 preferably includes a plurality of projections, such as for example tabs 88 and a plurality of tabs 90 and a plurality of tabs 92. In the illustrated embodiment, four tabs 88 are positioned around the periphery of body 84 oriented outward at a uniform relative axial position around the periphery of body 84 near top surface 94 of cylindrical body 84. The illustrated embodiment of collar 56 also includes four tabs 90 oriented around the periphery of cylindrical body 84 oriented outward at a lower relative axial position compared to tabs 88 and positioned closer to bottom surface 96 of cylindrical body then top surface 94. The illustrated embodiment of collar 56 also includes four tabs 92 located on cylindrical body 84 oriented inwardly around the periphery of inner opening 86. Collar 56 also includes three tabs 98 positioned on bottom surface 96 and oriented inwardly toward inner opening 86. More or less such projections may be used, such as two, three, five or otherwise at a given level or depth. Collar 56 may be formed from any suitable material including, but not limited to, metal, plastic, ceramic, rubber and the like. In a preferred embodiment, collar 56 is formed into a cylindrical shape from a unitary sheet of metal as shown in FIG. 14, with tabs 88, 90, and 92 pressed radially inward or outward using appropriate metal forming techniques known in the art.

Lamp assembly 50 is assembled by stringing wires 64 and terminals 66 through inner openings 82 and 86 shown in FIG. 6. Housing 58 is then positioned in recess 76 with rim 60 abutting wall 72 so that outer surface 74 surrounds the periphery of housing 58. Collar 56 is then press fit over member 62 thereby sandwiching grommet skirt 54 between housing 58 and collar 56. Tabs 92 interface with member 62 to allow only a one-way motion in a relative tightening direction when pressing collar 56 up member 62 in the direction of housing 58. Tabs 92 are configured that they may interface with member 62 to prevent, or at least impede, movement in the opposite direction such as when pulling collar 56 away from housing 58. Tabs 98 may block member 62 from advancing past bottom surface 96 when pressing collar 56 onto member 62. Once assembled as illustrated in FIGS. 1-5, lamp assembly 50 is preferably permanently assembled such that disassembly would result in damage to one or more components of lamp assembly 50.

Lamp assembly 50 is mounted on a vehicle or trailer by stringing wires 64 and terminals 66 through an opening in the vehicle or trailer and inserting collar 56 into the opening in the vehicle or trailer with grommet skirt 54 abutting the outer surface of the vehicle or trailer and covering the hole in the vehicle or trailer. It includes one or more lighting elements, such as LED's, under lens or cover 58. Tabs 88 and/or 90 are configured to snap through an opening in the outer panel of the vehicle or trailer that lamp assembly 50 is mounted and to then lock against the back side of that opening to prevent removal of lamp assembly 50. Tabs 88 and 90 are located at different depths as shown in FIG. 3 with tabs 88 being located at depth D1 and tabs 90 being located at depth D2. The combination of tabs 88 and 90 at depths D1 and D2 allow lamp assembly 50 to be used in a variety of vehicles having different mounting panel or opening thicknesses.

Figure 11:
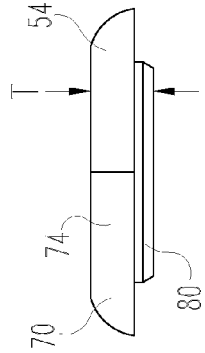
FIG. 11 is a right side elevational view of the FIG. 7 grommet skirt.
Figure 10:
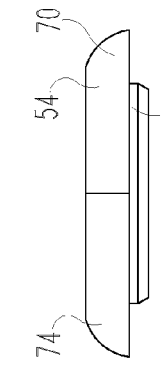
FIG. 10 is a left side elevational view of the FIG. 7 grommet skirt.
Figure 12:
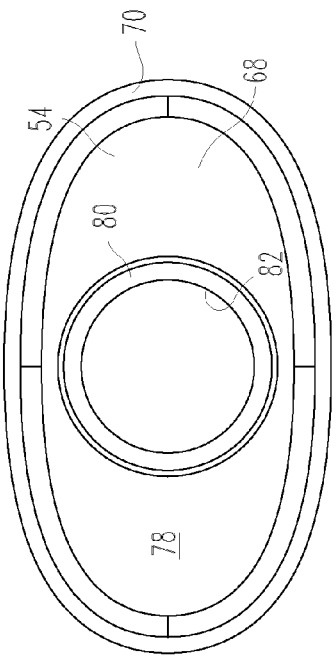
FIG. 12 is a bottom plan view of the FIG. 7 grommet skirt.
Figure 16:
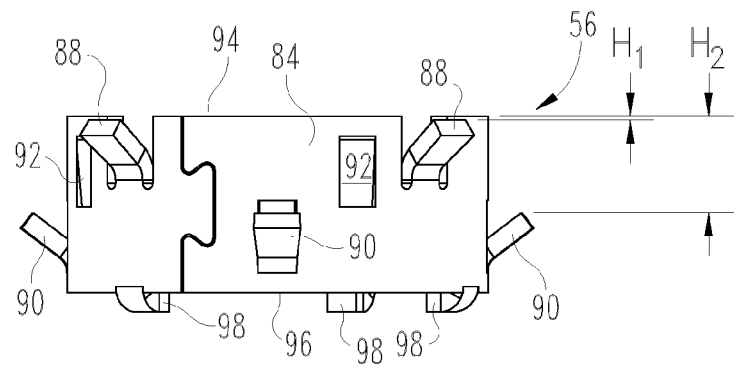
FIG. 16 is a front elevational view of the FIG. 14 collar.
Figure 17:
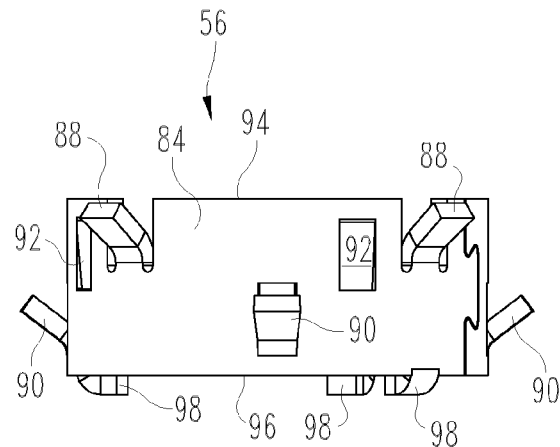
FIG. 17 is a left side elevational view of the FIG. 14 collar.
Figure 18:
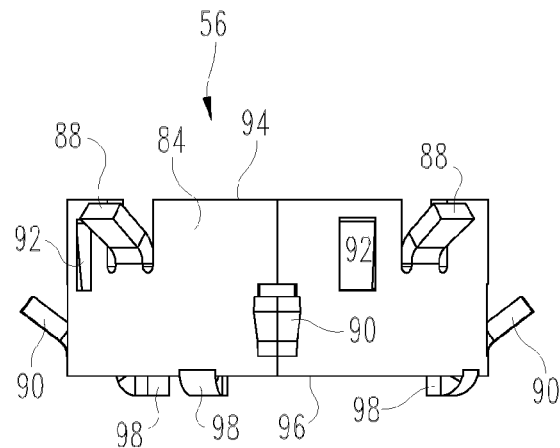
FIG. 18 is a right side elevational view of the FIG. 14 collar.
Figure 19:
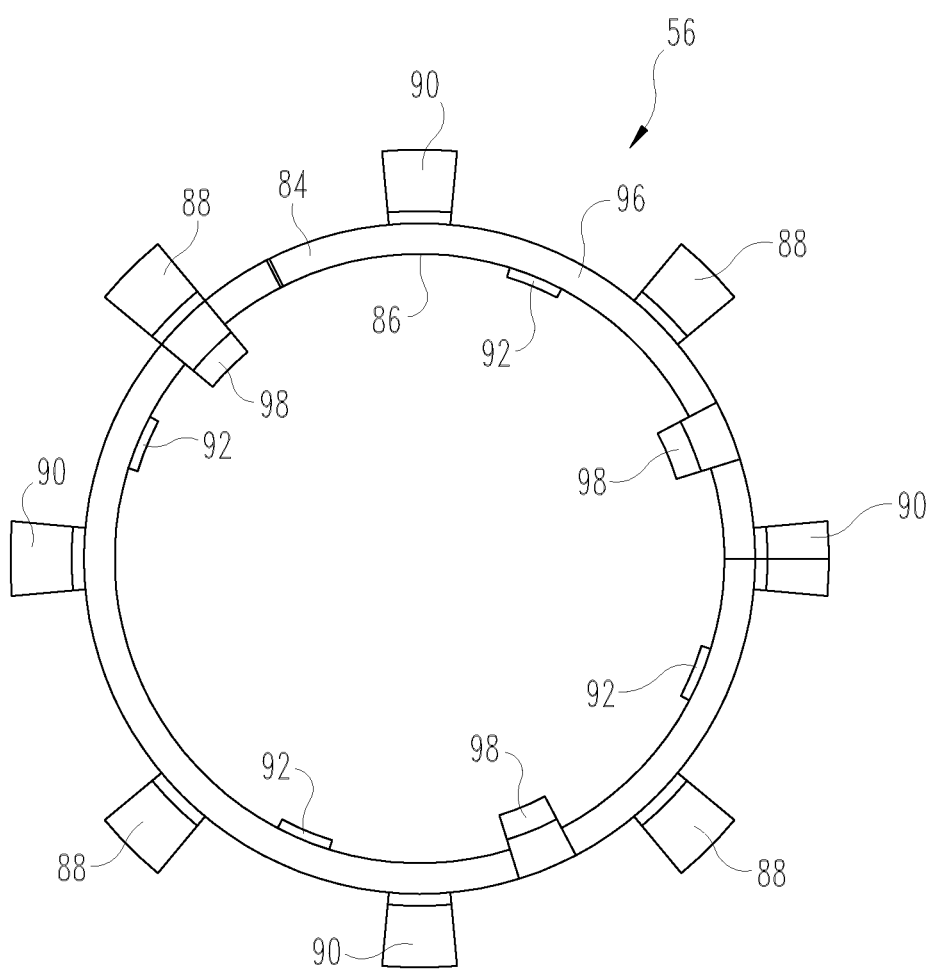
FIG. 19 is a bottom plan view of the FIG. 14 collar.

Various depths D1 and D2 can be achieved by varying the relative axial position of tabs 88 and 90 and/or the configuration of grommet skirt 54. In addition to various "depths", various levels may be used in addition or instead of various depths. Such levels or depths may be coplanar or non-coplanar. As an example of coplanar depths, as shown in FIG. 11, grommet skirt 54 includes thickness T. As shown in FIG. 16, the axial position of tabs 88 may be identified by height H1 and the axial position of tabs 90 may be identified by height H2. Collar 56 may be manufactured with varying heights H1 and H2 and grommet skirt 54 manufactured with varying thickness T. Appropriate components may then be selected for grommet skirt 54 and/or collar 56 to generate a depth D1 and/or D2 for a particular application while keeping other components standard. For example, the height H1 and its corresponding depth D1 corresponds to the distance between surface 102 and 106 of vehicle panel 100 (metal or otherwise, such as part of a vehicle) 100, shown in FIG. 20. As a further example, the height H2 and its corresponding depth D2 corresponds to the distance between surface 108 and 112 of vehicle panel 107 (metal or otherwise, such as part of a vehicle), shown in FIG. 21.

Tabs 88 and 90 are deflectable inwardly during installation to permit easy snapping of lamp assembly 50 into position on a vehicle or trailer. After being mounted, tabs 88 and/or 90 snap back into the illustrated configuration and block removal of lamp assembly 50 through the mounting hole in the vehicle or trailer.

Referring again to FIG. 20, lamp assembly 50 is illustrated installed through vehicle panel 100. As illustrated, vehicle panel 100 includes outer surface 102, opening 104, and inner surface 106. Lamp assembly 50 is inserted through opening 104, which biases tabs 88 and 90 inwardly to clear opening 104. Once tabs 88 clear opening 104, they spring back into the illustrated configuration and abut inner surface 106. Attempts to pull lamp assembly 50 out of opening 104 are resisted by tabs 88 abutting inner surface 106. Grommet skirt 54 rests on outer surface 102 and obscures opening 104.

Referring now to FIG. 21, lamp assembly 50 is illustrated installed through vehicle panel 106. Vehicle panel 106 is substantially thicker than vehicle panel 100 and includes outer surface 108, opening 110 and inner surface 112. Lamp assembly 50 is inserted through opening 110, which biases tabs 88 and 90 inwardly to clear opening 110. Once tabs 90 clear opening 110, they spring back into the illustrated configuration and abut inner surface 112. Attempts to pull lamp assembly 50 out or opening 110 are resisted by tabs 90 abutting inner surface 112. Grommet skirt 54 rests on outer surface 108 and obscures opening 110. It shall be understood that vehicle panels 100 and 107 may comprise any structure suitable for mounting lighting assemblies on a vehicle, such as a truck or trailer.

While not illustrated, the mounting features disclosed herein can be combined with other known mounting features. For example, bayonet style mountings are common in side marker lamps where the lamp assembly includes a profiled geometry that only allows insertion of lamp assembly 50 into the mounting hole in one orientation after which the lamp assembly may be rotated and locked into final position. Such assembly may also include a fastener to secure the rotational position of the lamp assembly. Tabs 88 and/or 90 may be included with such a configuration to prevent removal of the lamp assembly regardless of its orientation after installation. As such, installation may be first axial insertion into the mounting hole followed by rotational snap fitting of the tabs or other protrusions.

Similarly, tabs 88 and 90 may be configured for use with a helical style installation where the lamp assembly is rotated in a helical path when installing onto the vehicle or trailer. Such a system may optionally secure the angular orientation of the lamp assembly in the mounting hole. In such a system, tabs 88 and 90 could be configured to block removal of lamp assembly while the helical installation feature may optionally also be used to maintain the angular positioning of the lamp assembly.

While the embodiment disclosed herein utilizes tabs 92 to secure collar 56 to member 62, other methods may be utilized to permanently affix collar 56 to member 62 and/or housing 58. For example, member 62 may include recesses to receive tabs 92 or member 62 may optionally include a locking structure that would interface with cylindrical body 84 to lock collar 56 onto member 62. Optionally, one set of tabs, such as inwardly directed tabs 92 resist movement or partial separation in one axial direction, whereas another (e.g. tabs 88 and/or 90) may resist in the opposite axial direction. Furthermore, other forms of comparatively permanent mounting may be utilized including, but not limited to, adhesives, cements, welding, brazing, or otherwise.

While the embodiment disclosed herein utilized two levels of tabs 88 and 90, additional or fewer levels of tabs may be included as desired to increase the applications for which a single configuration lamp assembly 50 may be used in. Similarly, additional or fewer individual tabs 88, 90 and 92 may be used as desired.

This disclosure serves to illustrate and describe the claimed invention to aid in the interpretation of the claims. However, this disclosure is not restrictive in character because not every embodiment covered by the claims is necessarily illustrated and described. All changes and modifications that come within the scope of the claims are desired to be protected, not just those embodiments explicitly described.

I claim:

1. A lamp assembly for attachment to a vehicle, comprising:
   a lamp which includes a housing having an axially extending member, said axially extending member extendable through an opening in a vehicle mounting panel and below the vehicle mounting panel;
   a collar around at least a portion of said axially extending member, said collar separate and distinct from said housing and said axially extending member;
   said collar being removably mountable to said axially extending member wherein the collar is configured to be non-destructively removable from said axially extending member;
   said collar having a first set of projections to snap fit attach to the vehicle mounting panel at a first depth;
   said collar having a second set of projections to snap fit attach to the vehicle mounting panel at a second depth; and,
   said collar having a third plurality of tabs projecting radially inwardly toward, and biting into, said axially extending member.

2. The assembly of claim 1 wherein said first set of projections comprise first tabs which project radially outward of said collar, said first tabs being deflectable radially inwardly as said collar is inserted into the opening in the vehicle mounting panel, said first tabs being located co-planar with each other.

3. The assembly of claim 2 wherein said second set of projections comprise second tabs which project radially outward of said collar, said second tabs being deflectable radially inwardly as said collar is inserted into the opening in the vehicle, said second tabs being located co-planar with each other and at a depth axially below said first tabs.

4. The assembly of claim 1 wherein said third plurality of tabs resists movement in an axial direction opposite of said first tabs and said second tabs.

5. The assembly of claim 4 wherein said collar comprises a fourth plurality of tabs positioned on a bottom surface of said collar and oriented inwardly.

6. The assembly of claim 1 wherein said collar is made of metal.

7. The assembly of claim 6 wherein said axially extending member is made of plastic.

8. The assembly of claim 6 wherein said collar is made of a unitary sheet of metal formed in a cylindrical shape.

9. The assembly of claim 8 wherein said first tabs and said second tabs are stamped from said unitary sheet of metal and bent to project radially outward.

10. The assembly of claim 1 wherein said lamp comprises at least one LED.

11. The assembly of claim 1, further comprising a skirt around said lamp.

12. The assembly of claim 11, wherein said skirt is made of a flexible material.

13. The assembly of claim 12, wherein said flexible material is rubber.

14. A theft resistant collar adapted for use in connection with a lamp assembly for attachment to a vehicle, the lamp assembly having a lamp which includes a housing having an axially extending member extendable through an opening in a vehicle mounting panel and below the vehicle mounting panel, comprising:
- an annular collar body defining an opening, wherein said opening is configured to receive said axially extending member, said collar having at least one tab extending radially into said opening;
- said collar being securable to said axially extending member;
- said collar separate and distinct from said housing and said axially extending member;
- said collar having a first plurality of projections to snap fit attach at a first depth;
- said collar having a second plurality of projections to snap fit attach at a second depth; and,
- said collar having a third plurality of tabs projecting radially inwardly into said axially extending member to secure said axially extending member to said collar.

15. The assembly of claim 14 wherein said first set of projections comprise first tabs which project radially outward of said collar, said first tabs being deflectable radially inwardly as said collar is inserted into the opening in the vehicle mounting panel;
- wherein said second plurality of projections comprise second tabs which project radially outward of said collar, said second tabs being deflectable radially inwardly as said collar is inserted into the opening in the vehicle; and
- wherein said third set of tabs is configured to resist movement in an axial direction opposite of said first tabs and said second tabs.

16. The assembly of claim 15 wherein said collar is made of metal.

17. The assembly of claim 16 wherein said collar is made of a unitary sheet of metal formed in a cylindrical shape, wherein said first tabs and said second tabs are stamped from said unitary sheet of metal and bent to project radially outward.

18. The assembly of claim 17 wherein said third set of tabs are stamped from said unitary sheet of metal and bent to project radially inward.

19. The assembly of claim 15 wherein said collar comprises a fourth plurality of tabs positioned on a bottom surface of said collar and oriented inwardly.

* * * * *